United States Patent
Damico

(10) Patent No.: US 6,193,460 B1
(45) Date of Patent: Feb. 27, 2001

(54) EXTENDIBLE REAR BUMPER FOR AN EXTENDIBLE TILT BED ROLL OFF TRUCK

(76) Inventor: Robert J. Damico, 1259 Five Mile Line Rd., Webster, NY (US) 14580

( * ) Notice: Subject to any disclaimer, the term of this patent is extended or adjusted under 35 U.S.C. 154(b) by 0 days.

(21) Appl. No.: 08/822,343

(22) Filed: Mar. 20, 1997

(51) Int. Cl.$^7$ .............................. B60P 1/22; B60R 19/38
(52) U.S. Cl. .......................................... 414/494; 293/118
(58) Field of Search ..................... 293/118, 119, 293/144, 145; 414/494

(56) References Cited

U.S. PATENT DOCUMENTS

| | | | |
|---|---|---|---|
| 2,191,368 | 2/1940 | Cavanaugh | 293/119 |
| 3,332,562 | 7/1967 | Kokott | 414/563 |
| 3,751,092 | 8/1973 | Granig | 293/119 |
| 4,018,299 | 4/1977 | Nagin, Jr. et al. | 180/282 |
| 4,026,590 | 5/1977 | Holm | 293/118 |
| 4,116,482 | 9/1978 | Spiegel | 296/180.3 |
| 4,410,207 | 10/1983 | Scharf | 293/118 |
| 4,437,696 * | 3/1984 | Straub | 293/118 |
| 4,722,651 | 2/1988 | Antal | 414/24.5 |
| 4,809,924 | 3/1989 | Martens et al. | 242/470 |
| 4,988,258 | 1/1991 | Lutz et al. | 414/500 |
| 5,022,703 | 6/1991 | Westbrook | 296/183 |
| 5,193,836 * | 3/1993 | Hastings | 293/118 X |
| 5,360,311 | 11/1994 | Lutz et al. | 414/494 |

FOREIGN PATENT DOCUMENTS

| | | | |
|---|---|---|---|
| 2309139 | 8/1973 | (DE) | 293/119 |
| 60-12357 | 1/1985 | (JP) | 293/118 |
| 6-171444 | 6/1994 | (JP) | 293/118 |
| 6-247241 | 9/1994 | (JP) | 293/118 |
| 6-270750 | 9/1994 | (JP) | 293/118 |

* cited by examiner

Primary Examiner—Andrew C. Pike
(74) Attorney, Agent, or Firm—Harter, Secrest & Emery LLP; Brian B. Shaw

(57) ABSTRACT

An extendible bumper for an extendible tilt bed roll off truck is pivotally attached to a single hydraulic cylinder which is pivotally attached to the truck frame. The hydraulic cylinder is centrally positioned on the extendible bumper. A pair of guide rods extend from the extendible bumper and telescope into and out of a pair of guide rod holders, one on each side of the hydraulic cylinder. Because the bumper assembly is attached to the truck frame as opposed to the extendible tilt bed, the assembly is provided with a certain amount of clearance before the bumper requires retraction. Indication means for indicating when the extendible bumper is in its fully retracted position may be provided by an indicator switch which becomes depressed when the extendible bumper abuts the truck's stationary bumper. The depressed indicator switch actuates a cab indicator light for indicating full retraction. Height adjustment plates may connect the extendible bumper to the guide rods and/or the pivotal hydraulic cylinder for adjusting the height of the extendible bumper with respect to the ground as regulations change and for providing a simple and inexpensive means for repairing the bumper assembly should it become damaged.

12 Claims, 5 Drawing Sheets

EXTENDIBLE REAR BUMPER FOR AN EXTENDIBLE TILT BED ROLL OFF TRUCK

FIELD OF THE INVENTION

This invention relates to rear bumpers for trucks, and more particularly to an extendible rear bumper for an extendible tilt bed roll off truck.

BACKGROUND OF THE INVENTION

Pursuant to existing government regulations any motor vehicle manufactured after 1952, and having a body with a clearance at the rear end of more than 30 inches from the ground when empty, must be provided with bumpers or devices serving similar purposes constructed and located so that the clearance between the effective bottom of the "bumpers" and the ground does not exceed 30 inches with the vehicle empty and the "bumper" should not be located more than 24 inches forward of the extreme rear of the vehicle. This regulation was put into effect to prevent the front ends of smaller passenger vehicles from driving underneath a bed of a truck and potentially causing harm to the passengers upon the truck breaking through the front window of the passenger vehicle.

Dump trucks which have boxes which overhang the rear axles and extend rearwardly thereof provide a hazard for rear end collisions, particulary those in which the impact is moderate and the occupants of the rear vehicle involved in the rear end collision are exposed to impact with the base of the box of the dump truck. In particular, rear end collisions of this type expose the occupants of the oncoming rear vehicle to extremely hazardous conditions, since the oncoming vehicle frequently will find no significant abutment surface until the forward portion of the oncoming passenger vehicle strikes the axle housing or the rear wheels of the dump truck. Therefore, the government has the mandated "bumper" locations to address this problem.

When arranged in an overhanging relationship, upon dumping, the rear or tailgate portion of the truck which meets these regulations will extend or pivot downwardly toward the ground, and in doing so would bend, break, or possible destroy any bumper which may be disposed there.

On the other hand, if a bumper was arranged at the position which would not interfere with the normal dumping operation, such a bar would provide little if any protection for the occupants of oncoming vehicles, since it would necessarily be disposed at a substantial elevation from the ground.

Trucks which have fixed length conventional beds do not present significant problems, in much as the bed is fixed relative to the truck frame and thus providing such trucks with a bumper is not a problem.

Because trucks of the present invention typically are more than 30 inches off the ground, they are encompassed by the regulations. The contemplated vehicles employ extendible beds, which are disposed on a tilt frame; while it would be desirable for bumpers to be much lower than 30 inches and to be positioned closer than 24 inches to the rear of the bed supporting structure, doing so would make it impossible to tilt the platform or bed without having the bumper contact the ground and be bent or destroyed. Several types of load carrier vehicles are provided with a load carrying member which is tiltable to receive a load and to discharge a load. If such a vehicle travels on the highways and streets it is necessary for the vehicle to include a bumper to protect other vehicles as previously described. Ordinarily, the only suitable location for a bumper is as a part of the tiltable load carrying member. However, a problem exists, in that a bumper fixedly attached to the tiltable load carrying member may engage the ground and interfere with the tilting of the load carrying member.

In certain congested areas, such as Boston, Mass., or in some receiving/loading docks, a fixed length tiltable load carrying member is problematic. A driver normally prefers to drive a truck with a short bed length. This reduces gas consumption and allows access to "limited" areas. However, if the load which is to be picked up is lengthy, it is necessary to drive a truck with a corresponding bed length. Furthermore, even if the short bed length is sufficient to carry the load, some receiving/loading docks may have height restrictions which do not allow the bed to tilt up to its maximum angle in order to receive or drop the load. For at least these reasons, it is desirable to provide a truck having an extendible, as well as tiltable, bed.

There have been some efforts to resolve the problems associated with bumpers on tilt bed trucks such as fastening bumpers to the rear of the truck in a way that allows them to be quickly disconnected either altogether or in part, and folded to a retracted position before the bed of the truck is tilted. This is still a problem, since it is easy to forget to attend to the bumpers, which are accordingly bent or destroyed when the bed of a roll off truck is tilted. These types of bumpers are typically not adjustable to accommodate changes in regulations, and typically require a driver to get in and out of the cab to move the bumper and then tilt the bed.

Vehicles with a tiltable load carrying member with an attached bumper have also been provided with means to move the bumper from its active or extended position to permit tilting the load carrying member to its maximum position without interference by the bumper. Such means for moving the bumper typically have required separate actuator members for moving the bumper from its active extended position to an inactive retracted position. Also, a pair of actuator members are normally employed, one on each end of the bumper, often resulting in uneven deployment of the bumper, and even damage to the bumper and/or both actuators if one actuator is not functioning. These devices, some of which are automatically activated when the bed begins to tilt up or down, can be quite expensive to add to a new or existing truck. In the event of an electrical or mechanical failure in the device, irreparable damage to the device could occur from a tilt bed tilting on the device, unbeknownst to the driver. Such damage would then require costly repair or replacement procedures which also would take the truck off the road for extended periods of time.

Thus, there is a need for a simple, low cost extendible rear bumper for a truck having tiltable and extendible bed, wherein the extendible rear bumper is attached to the frame of the truck. There is also a need for an extendible bumper with an adjustable height mechanism so that the entire bumper need not be replaced as federal regulations change. There is also a need for an extendible bumper with an indication means so that the driver of the truck will know when the bumper is in its retracted position. There is a further need for an extendible bumper which extends and retracts steadily from the rear of the truck, and remains parallel with the rearmost bar of the truck frame. There is further the need to provide an extendible rear bumper which is easy to repair.

SUMMARY OF THE INVENTION

In accordance with this invention there is provided a rear bumper for a truck that is easily retracted to a position essentially flush with the rear structure of the truck when not in use, and can be extended to well within the two feet from the back end of the truck as required by current ICC regulations. Moreover, the bumper can be easily positioned 24 inches or closer to the ground, thus providing a greatly improved functioning with respect to the bumpers of cars and other vehicles which are specifically much lower than 30 inches.

The present bumper is preferably supported on two spaced-apart telescoping tubes mounted to the frame of the truck, into which two extendible rods connected to the bumper are received. A conventional hydraulic cylinder or drive piston structure is attached at one end to the frame of the truck, and the other end to the bumper for allowing the bumper to be selectively extended into position, or retracted to allow titling of the bed of the truck. The hydraulic cylinder is provided with a balancing valve to inhibit the ability of the cylinder to collapse in the event of impact.

The truck to which this extendible bumper is attached is preferably an extendible tilt bed roller off type truck. The truck has a truck frame fixedly connected to a rear axle, an extendible tilt frame pivotally connected to the truck frame, a truck bumper attached to the truck frame, and a typical cab for accommodating the driver, the cab having at least a driver's sideview mirror. Directly attached to the truck frame are the guide rod holders which accommodate the guide rods which are attached to the extendible bumper. The truck bumper or the extendible bumper is provided with an indicator switch which will be depressed when the extendible bumper is in the retracted position. The cab is provided with an indicator light which is turned on when the indicator switch is depressed and is turned off when the indicator switch is not depressed, for indicating when the extendible bumper is in the retracted or the extended position.

An indicator rod is attached to one end of the extendible bumper substantially along the same longitudinal axis as the longitudinal axis of the extendible bumper. The indicator rod is positioned so as to be viewable from the truck sideview mirror for indicating whether the extendible bumper is in a retracted position or an extended position. The extendible bumper is further provided with at least one height adjustment plate. The at least one height adjustment plate may be attached between an end of the drive piston and the extendible bumper for adjusting the height of the bumper relative to the piston, or may be attached between an end of the guide rod and the bumper for adjusting the height of the bumper with respect to the guide rods. Thus, as regulations change, the height of the bumper can be accommodated without having to replace the entire extendible bumper assembly.

As previously discussed, the hydraulic cylinder may be provided with a balancing valve to inhibit the cylinder from collapsing in the event of impact. In a preferred embodiment, the hydraulic cylinder may be connected to both the extendible bumper and the truck frame by pivotal connection. This is important because the hydraulic cylinder is the most expensive portion of the extendible bumper assembly. The connection to the extendible bumper, for example, may be made by providing the extendible bumper with two pivot ears through which a pivot pin is connected to the hydraulic cylinder. The pivotal connection allows the hydraulic cylinder to essentially float with respect to the bumper. This provides for a vertical window which extends above and below the piston so that it can pivot when something is dropped on the bumper. When a heavy object is dropped on the bumper, the pivot ears may snap off in which case the hydraulic cylinder would pivot and fall to the ground. Even if the guide rods snapped, the guide rods are easily replaceable and very inexpensive. The pivoting piston as well as the height adjusting plates allow for damage of the bumper to be repaired very easily.

Other and further objects of the present invention will become apparent to those skilled in the art upon a study of the following specification, appended claims, and accompanying drawings.

DETAILED DESCRIPTION OF THE PREFERRED EMBODIMENTS

Figure 1:
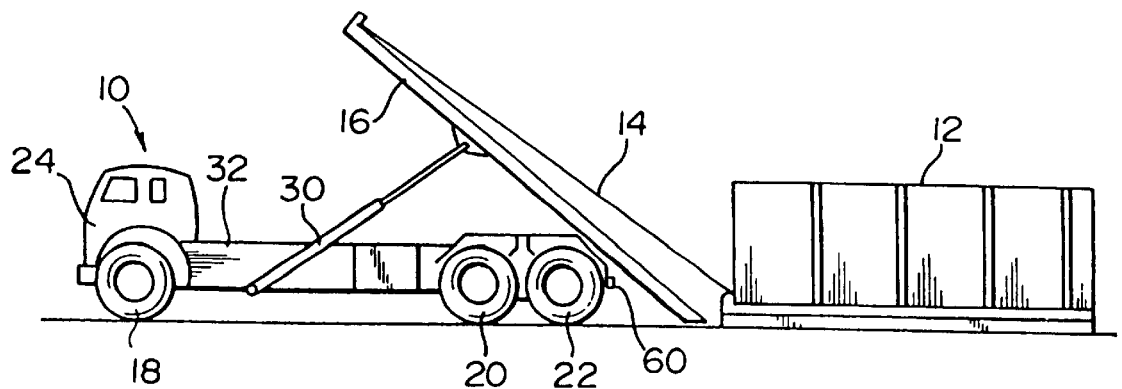
FIG. 1 is a side elevational view of a load carrying vehicle having a tiltable load carrier member and illustrating the load carrier member in its maximum angular position, as in preparation for receiving a load.
Figure 2:
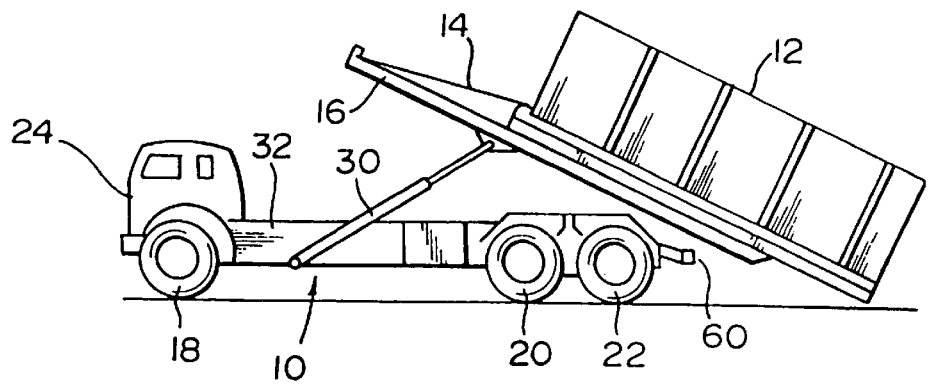
FIG. 2 is a side elevational view, illustrating the load carrying member angularly moving from its maximum inclined position towards its horizontal position, as the load carrier member receives a load.
Figure 3:
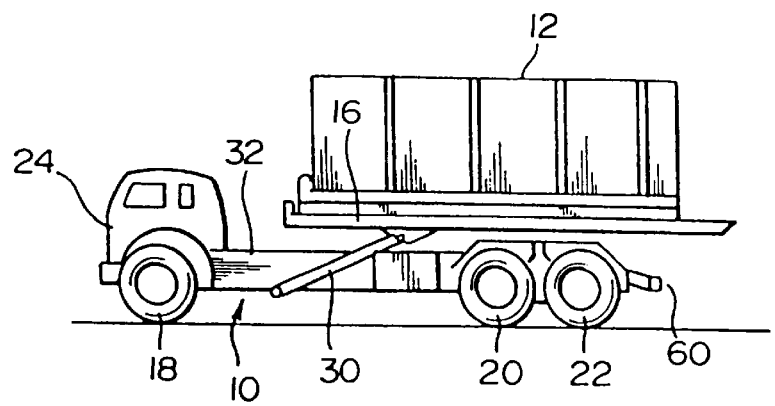
FIG. 3 is a side elevational view illustrating the load carrier member in its horizontal position with a load upon the load carrier member.

FIGS. 1, 2, and 3 illustrate a load carrier vehicle 10 having a frame 32 and a tiltable and extendible load carrying member or bed 16. The vehicle 10 has front wheels 18, and rear wheels 20 and 22. The vehicle 10 also includes a cab 24. Linearly operable hydraulic motors 30 are pivotally attached to the frame 32 and to the load carrying member 16 for pivotal movement thereof. A load 12 is drawn onto the load carrying member 16 by a cable 14. Of course other methods and devices for pulling or pushing the load 12 onto the bed 16 may be used. The bed 16 is in an extended position as shown in FIG. 2 so that the angle between the bed 16 and the ground is reduced.

Figure 4:
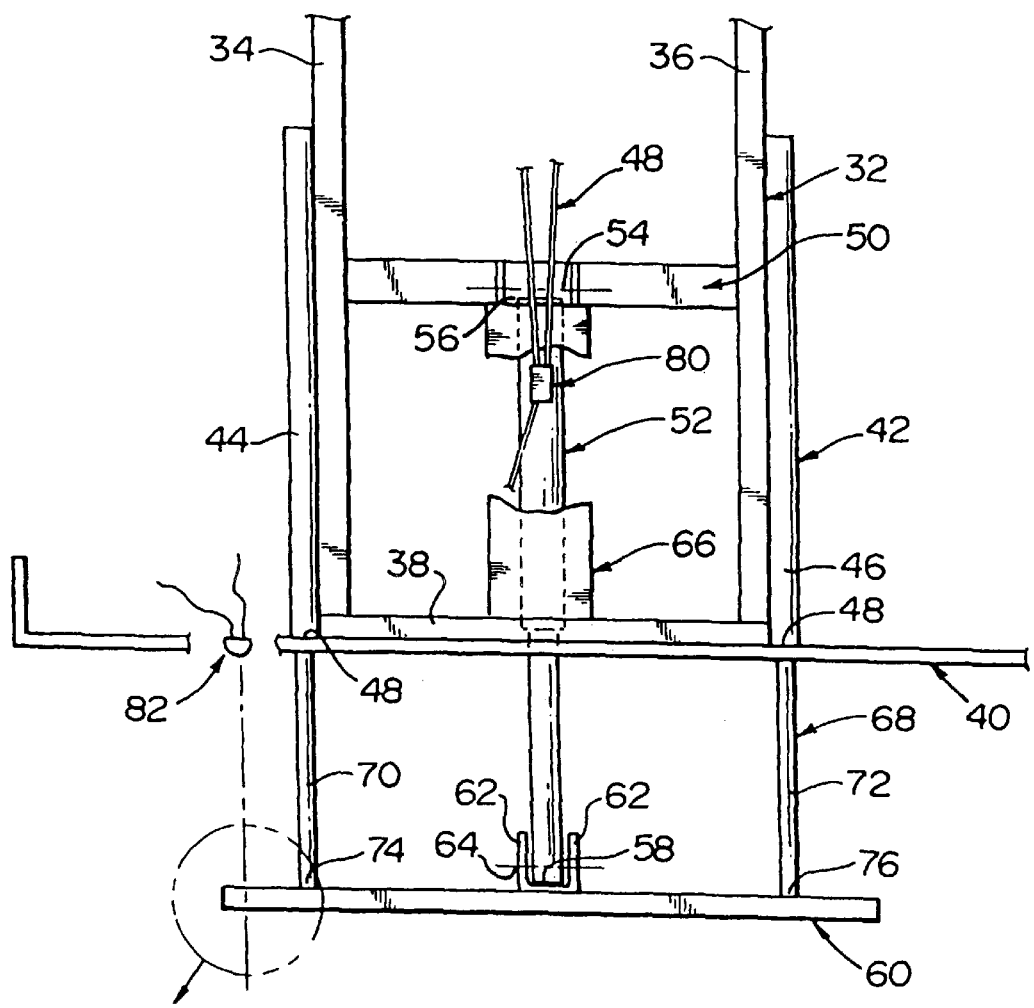
FIG. 4 is a top schematic view of the extendible bumper of the present invention in its fully extended condition in relation to the truck frame and truck bumper.

As shown in FIG. 4, the truck frame 32 is provided to support the extendible tilting bed 16. The truck frame 32 preferably has at least two elongate longitudinal beams 34 and 36 and a rear cross beam 38. Connected to the rear beam 38 is a standard truck bumper 40. The truck bumper 40 is stationary and immovable relative to the truck frame 32. Attached to the truck frame 32 are preferably at least two guide rod holders generally referenced as 42. The guide rod holders 42 may be formed of any of a variety of materials including metal, or tubing or riged plastics. Guide rod holders 44 and 46 are positioned exteriorly of the beams 34 and 36 respectively. The rearmost portion of the guide rod holders 42 is shown at 48. Ends 48 abut truck bumper 40.

Figure 6:
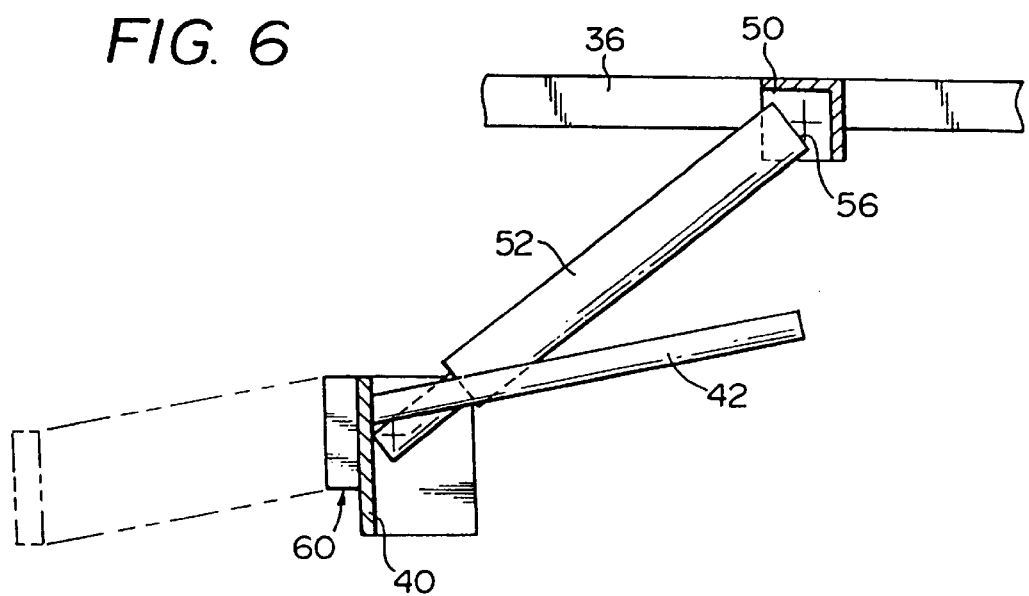
FIG. 6 is a side schematic view of the bumper in a retracted position.
Figure 7:
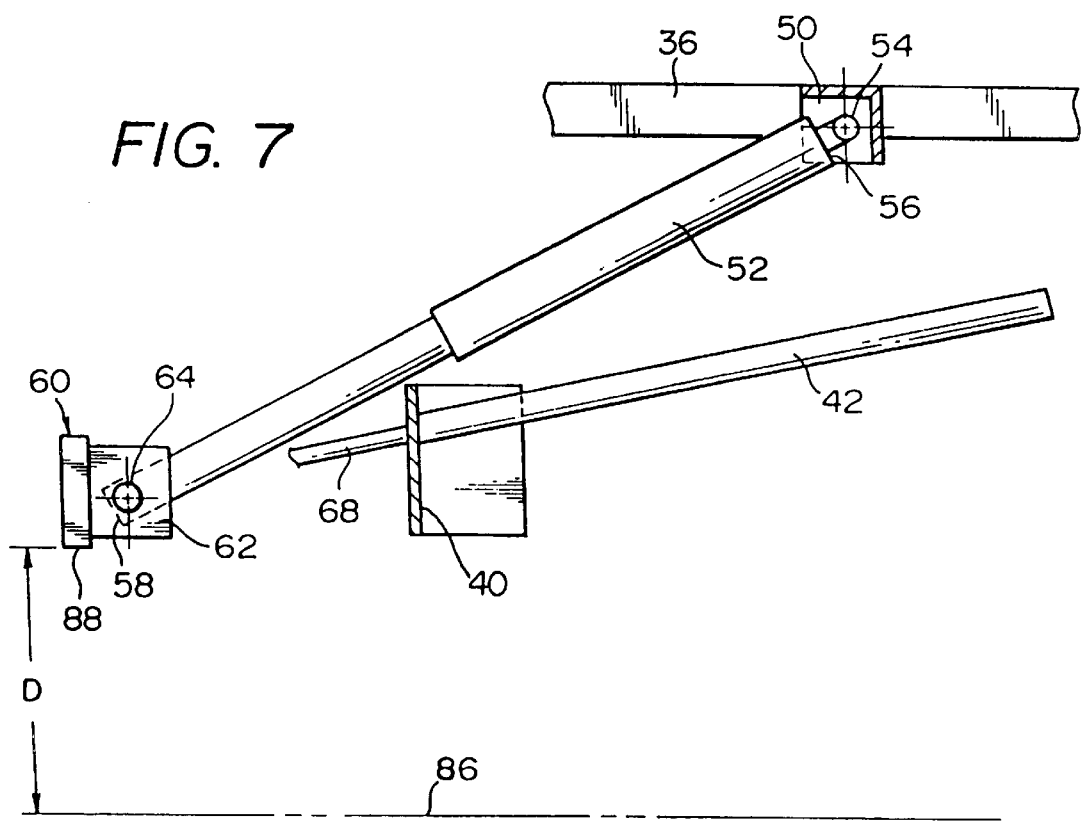
FIG. 7 is a side schematic view of the bumper in an extended position.

Attached to beams 34 and 36 in a transverse relationship is a support bracket 50 which connects the side beams. A hydraulic cylinder or drive piston 52 is connected to a central portion of the support bracket 50 with a pivotal connection 54 at a first end 56 of the hydraulic cylinder. A second end 58 of the hydraulic cylinder 52 is connected to an extendible bumper 60. The second end 58 of the hydraulic cylinder 52 is pivotally connected to a central area of the extendible bumper 60 with a pivotal connection such as a pair of pivot ears 62 and a pivot pin 64. The hydraulic cylinder 52 is substantially parallel to a longitudinal dimension of the beams 34 and 36. The hydraulic cylinder 52 is substantially perpendicular to the support bracket 50 and the extendible bumper 60. As shown in FIGS. 6 and 7, the hydraulic cylinder may be disposed in a variety of inclinations with respect to the beams 34 and 36. A support brace 66 lies below the hydraulic cylinder 52.

The extendible bumper 60 is connected to the guide rods 68. As shown in FIG. 4, two guide rods are provided, 70 and 72, which are slideably movable into and out of guide rod holders 44 and 46, respectively. The guide rods 70 and 72 are provided with a first end hidden from view and inside of guide rod holders 44 and 46, respectively. The guide rods 70 and 72 are further provided with a second end, 74 and 76 respectively, which are attached to the extendible bumper 60.

The hydraulic cylinder 52 is provided with hydraulic supply lines 78 for operating the cylinder. The hydraulic cylinder may also be provided with a balance valve 80 which may inhibit the transfer of fluid upon an impact. As can thus be seen, only a single centrally positioned hydraulic cylinder 52 is required to extend and retract the extendible bumper 60. The guide rods 70 and 72 are not directly controlled, but instead enter and exit the guide rod holders 44 and 46 upon movement of the hydraulic cylinder 52 to assist in evenly guiding the extendible bumper towards and away from the truck bumper 40, and consistently parallel to the truck bumper 40. Thus, the extendible bumper 60 extends and retracts relative to the truck frame 32 in a smooth, steady fashion. Although it is possible to provide two or more hydraulic cylinders 52, a mechanical failure in one of the cylinders would deleteriously effect the operation of the extension or retraction of extendible bumper 60, and could cause breakage in either the guide rods or, worse yet, the other functional hydraulic cylinder.

Figure 5:
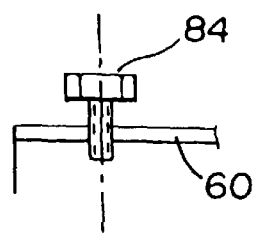
FIG. 5 is an enlarged view showing of a corresponding detail circle 5 of FIG. 4 showing an adjustable indicator switch.

One embodiment for alerting the driver of the truck of the position of the extendible bumper 60 is shown in FIG. 4. Cooperating structure is located on the extendible bumper 60 and the stationary truck bumper 40 to indicate whether or not the bumper 60 is in an extended or retracted position. As shown in FIG. 5 (an expanded view of detail circle 5 in FIG. 4), the structure includes an adjustable indicator switch shown at 84 positioned on the extendible bumper 60 and facing the truck bumper 40. Alternatively the adjustable indicator switch 84 may be positioned directly on the truck bumper 40 and facing the extendible bumper 60. When the extendible bumper 60 is in its fully retracted position and adjacent the truck bumper 40, the adjustable indicator switch 84 will become depressed, and will actuate a cab indicator light 82 located within the cab 24. Thus, if the cab indicator light 82 is not illuminated in the cab 24, the driver of the truck 10 will know that the extendible bumper 60 is not fully retracted. It is understood the indicator may be set such that the light is on upon the bumper 60 being in an extended position.

The retracted and extended positions of the extendible bumper 60 are shown in FIGS. 6 and 7, respectively. As is seen in both FIGS. 6 and 7, the hydraulic cylinder 52 and the guide rod holders 42 are angularly positioned with respect to the truck frame 32 as represented by side beam 36 wherein these angles are not necessarily equal. In FIG. 6, the extendible bumper 60 in its fully retracted position is adjacent the truck bumper 40. The guide rod 68, as well as the guide rod 70 which is hidden from view, is fully contained within the guide rod holder 42 in this retracted position. The telescoping, pivoting hydraulic cylinder 52, is connected to the support bracket 50 shown in cross section and the extendible bumper 60.

As shown in FIG. 7, when the extendible bumper 60 is in its fully extended position, the hydraulic cylinder 52 is outwardly telescoped and can assume a different angular orientation, as necessary, with respect to the truck frame and the extendible bumper 60 due to the pivotal connections. The second end 58 of the hydraulic cylinder 52 can be seen behind pivoting ear 62 connected by pivoting pin 64. A portion of a guide rod 68 is shown in FIG. 7 extended out of the guide rod holder 42. The guide rod 68 will enter into and out of guide rod holder 42 behind truck bumper 40. As can be seen in FIG. 7, a distance D between the ground 86 and the bottom 88 of the extendible bumper 60 is adjustable to accommodate modifications of existing regulations.

Figure 8:
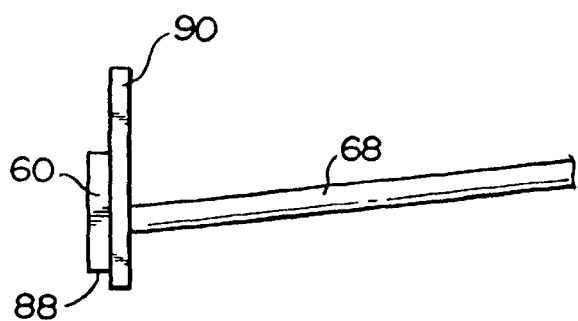
FIG. 8 is a side elevational schematic view showing a height adjustment plate for the guide rods and the piston.
Figure 9:
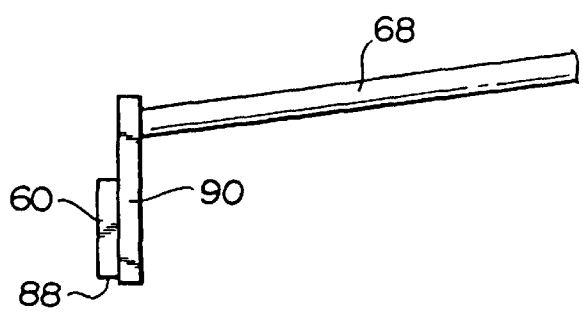
FIG. 9 is a side elevational view showing an alternative height adjustment plate for the guide rods and the piston.
Figure 10:
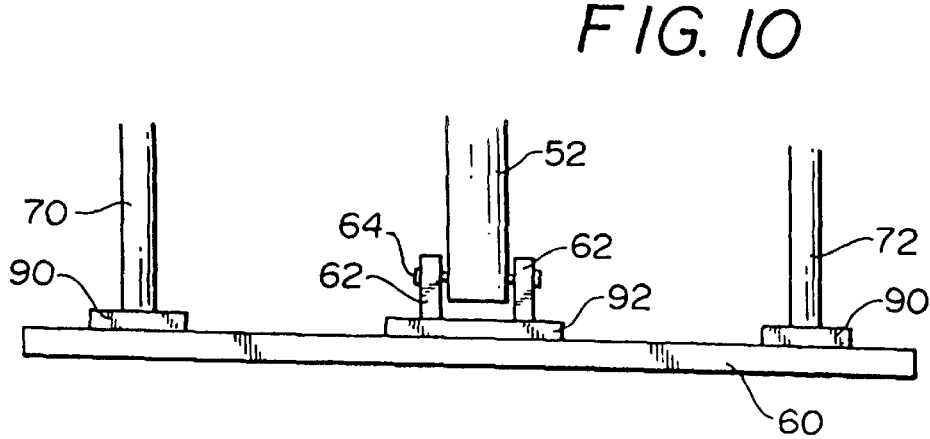
FIG. 10 is a top plan view showing the connection of the piston and the guide rod to the extendible bumper.

Turning to FIGS. 8–10, a means for accommodating greater height adjustments between the ground 86 and the bottom 88 of the extendible bumper 60 is shown. A height adjustment plate 90 may be welded or otherwise attached to the back of the extendible bumper 60. The height adjustment plate 90 is positioned on the extendible bumper 60 so as to be between the extendible bumper 60 and the ends 74 or 76 of the guide rods 70 and 72, respectively. As show in FIG. 8, the connection between a guide rod 68, the extendible bumper 60, and the height adjustment plate 90 may be so that the distance D between the ground 86 and the bottom 88 of the extendible bumper 60 is 30 inches as now required by ICC regulations. Should these regulations change and require, for example, that the bottom 88 of the extendible bumper 60 be 24 inches from the ground 86, the height adjustment plate 90 may be detached from the guide rod 68 and the guide rod 68 may be reattached at a higher position on the height adjustment plate 90. This reattachment will have the effect of shortening the distance D between the ground 86 and the bottom 88 of the extendible bumper 60. Furthermore, the adjustment required nothing more than a simple and inexpensive attachment operation such as welding. Although the pivotal connection between the end 58 of the hydraulic cylinder 52 and the extendible bumper 60 will accommodate certain height adjustments, greater height adjustments may be accommodated by a similar height adjustment plate 92 as shown in FIG. 10. The height adjustment plate 92 may be welded to the back portion of the extendible bumper 60 and to the front portion of the pivoting ears 62 so as to accommodate the height adjustment of the hydraulic cylinder 52. Thus, as regulations change, the entire bumper assembly need not be replaced but instead may be adjusted using the height adjustment plates 90 and 92.

Figure 11:
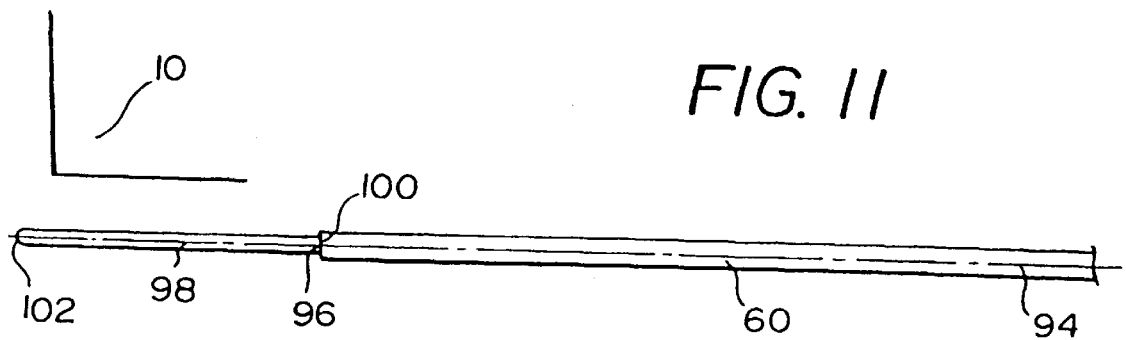
FIG. 11 is a top elevational view of an indicator rod.

As shown in FIG. 11, an alternate means for indicating to the driver of the truck 10 whether or not the extendible bumper 60 is in its fully retracted or extended position is shown. The extendible bumper 60 has an elongate axis 94. The driver's side end 96 of the extendible bumper 60 is provided with an indicator rod 98 attached at its first end 100 to the driver's side end 96 of the extendible bumper 60. A second end 102 of the indicator rod 98 extends beyond the truck body 10 so as to be viewable from the driver's side mirror. The indicator rod 98 may extend generally along the same axis 94 as the extendible bumper 60, or may be just generally parallel to the axis 94. The indicator rod 98 may be used in conjunction with the adjustable indicator switch 84 as previously described in FIG. 4, or may be used alone. When used in combination with the adjustable indicator switch and cab indicator light, the indicator rod 98 provides a general indication means of where the extendible bumper is when not in its fully retracted condition. Furthermore, the indicator rod 98 can serve as an indication means when the bulb in the cab indicator light 82 is burned out. The indicator rod 98 may be provided with a somewhat pivoting connection at its end 100, or may be slightly flexible. Alternatively, the indicator rod 98 may be provided with a simple weld connection between driver's side end 96 of extendible bumper 60 and end 100 of indicator rod 98. The indicator rod 98 thus provides a simple, nonelectric method of indicating the position of the extendible bumper 60.

The present invention encompasses a method of securing an extendible bumper 60 on a truck 10. The method generally includes the steps of pivotally attaching a single drive piston 52 to a truck frame 32; attaching at least two guide rods 68 to the extendible bumper 60; disposing the guide rods within at least two guide rod holders 42 on the truck frame 32; slideably moving the guide rods 68 within the guide rod holders 42; pivotally attaching the drive piston 52 to the truck frame 32 to pivot up towards the extendible bumper 60; and pivotally attaching the extendible bumper 60 to the piston.

Figure 12:
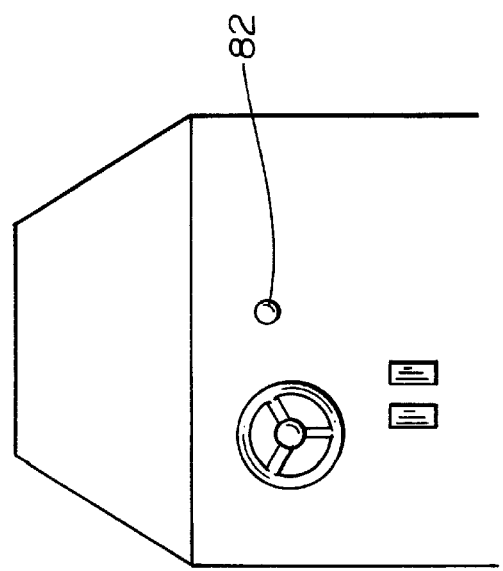
FIG. 12 shows an example of an indicator light in a cab.

In operation, the truck 10 will bear a resemblance to that shown in FIG. 3 when in a transport configuration. The extendible bumper 60 will be in its an extended condition. When the truck 10 reaches its destination, and the load is to be delivered, the tilt bed 16 will begin to rotate relative to the truck frame so as to remove the load 12 from the bed 16. Because the extendible bumper 60 is connected to the truck frame 32 rather than the tilt bed 16, the extendible bumper 60 will not immediately break if the tilt bed 16 begins its tilting operation. At this point, or prior to even beginning to tilt the tilting bed 16, the extendible bumper 60 may be retracted so as to be adjacent the truck bumper 40. The hydraulic line 78 is activated by known means so as to cause the hydraulic cylinder 52 to reduce its length, thus retracting the extendible bumper 60 and pulling it towards the truck bumper 40. The driver of the vehicle 10 will know when the extendible bumper is in its retracted position by either looking for the cab indicator light 82 or by watching the indicator rod 98 through the sideview mirror of the truck 10 attached, as shown in FIG. 12 to the cab 24.

Figure 13:
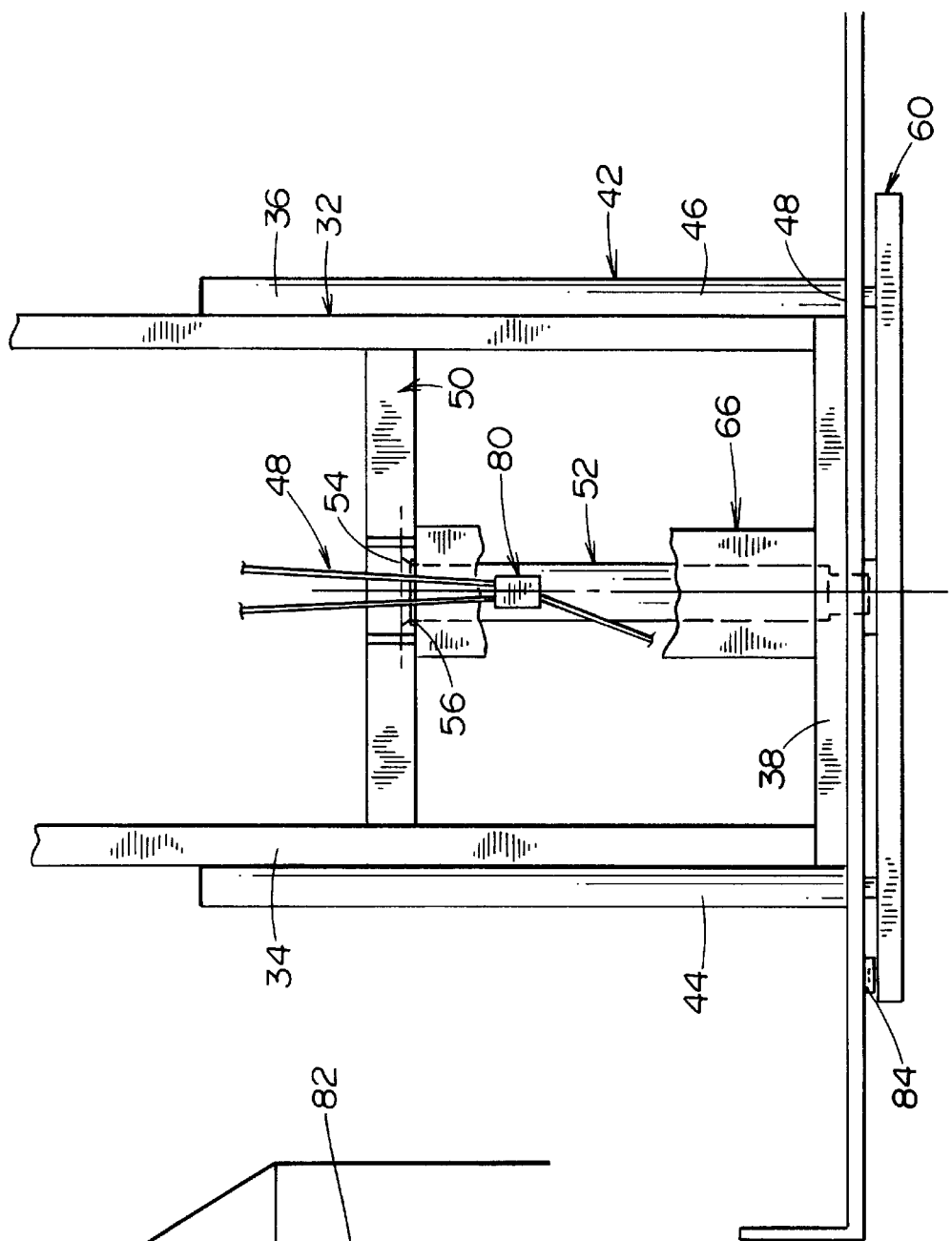
FIG. 13 shows the extendible bumper in a retracted position.

FIG. 13 illustrates the extendible bumper 60 is in it is retracted position.

Because certain delivery areas have very restricted height allotments, the extendible bed 16, instead of being tilted to a maximum angle as shown in FIG. 1, may instead be extended as shown in FIG. 2, so as to accommodate the load 12 in its delivery position. Thus, if the extendible bumper 60 was connected to the tilt bed 16 rather than the truck frame 32, the extendible bumper would be crushed as the bed 16 extends to the ground 86. When the delivery operation is over, and the tilt bed 16 is both retracted and returned to its parallel position with the truck frame 32, then the hydraulic cylinder 52 can be activated so as to push the extendible bumper 60 back to its fully extended position so as to meet regulations for returning the truck 10 to its original destination.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but it is to be limited only by the scope of the attached claims, including the full range of equivalency to which each element thereof is entitled.

I claim:

1. An extendible tilt bed roll off truck having a truck bumper, the truck further comprising:
   (a) a truck frame fixedly connected to a rear axle;
   (b) an extendible tilt frame pivotally connected to the truck frame to be moveable between a transport position and a loading/unloading position;
   (c) a drive piston having a first end and a second end, the first end being pivotally connected to the truck frame; and
   (d) an extendible bumper connected to the second end of the drive piston moveable between a retracted position adjacent the truck bumper and an extended position spaced from the truck bumper.

2. The truck as claimed in claim 1, wherein the extendible bumper is pivotably attached to the second end of the drive piston.

3. The truck as claimed in claim 1, further comprising at least two guide rods attached to the extendible bumper.

4. The truck as claimed in claim 3, further comprising at least two guide rod holders attached to the truck frame wherein the at least two guide rods are slideable within the at least two guide rod holders.

5. The truck as claimed in claim 4, wherein the truck bumper is attached to one end of each of the at least two guide rod holders.

6. The truck as claimed in claim 5, further comprising an indicator switch on the extendible bumper wherein the indicator switch will be depressed when the extendible bumper is in the retracted position.

7. The truck as claimed in claim 6, further comprising a cab, the cab having an indicator light which is turned on when the indicator switch is depressed and is turned off when the indicator switch is not depressed, for indicating when the extendible bumper is in the retracted position or the extended position.

8. The truck as claimed in claim 3, further comprising at least two height adjusting plates attached between the at least two guide rods and the extendible bumper.

9. The truck as claimed in claim 3, wherein the extendible bumper is pivotably attached to the second end of the drive piston.

10. The truck as claimed in claim 9, further comprising at least three height adjusting plates, one said plate attached between each of the at least two guide rods and the extendible bumper and one said plate attached between the second end of the drive piston and the extendible bumper.

11. The truck as claimed in claim 1, further comprising a cab having a driver's sideview mirror and further comprising an indicator rod attached to the extendible bumper wherein the indicator rod is adapted to be viewable from the sideview mirror.

12. The truck as claimed in claim 1, wherein the second end of the drive piston is connected to a midpoint of the extendible bumper.

\* \* \* \* \*